(12) United States Patent
Zhou

(10) Patent No.: US 12,318,016 B2
(45) Date of Patent: Jun. 3, 2025

(54) CAR SEAT NECK PILLOW WITH CLAMPING AND FIXING STRUCTURE

(71) Applicant: SHEN ZHEN STAND BY ME TECHNOLOGY LIMITED, Shenzhen (CN)

(72) Inventor: Zhiping Zhou, Huizhou (CN)

(73) Assignee: SHEN ZHEN STAND BY ME TECHNOLOGY LIMITED, Shenzhen (CN)

( * ) Notice: Subject to any disclaimer, the term of this patent is extended or adjusted under 35 U.S.C. 154(b) by 184 days.

(21) Appl. No.: 18/365,971

(22) Filed: Aug. 5, 2023

(65) Prior Publication Data
US 2025/0000267 A1    Jan. 2, 2025

(30) Foreign Application Priority Data
Jun. 30, 2023    (CN) .......................... 202321711239.0

(51) Int. Cl.
*A47C 7/38*        (2006.01)
*B60N 3/00*        (2006.01)

(52) U.S. Cl.
CPC ............... *A47C 7/383* (2013.01); *B60N 3/00* (2013.01)

(58) Field of Classification Search
CPC ................................. A47C 7/383; B60N 3/00
See application file for complete search history.

(56) References Cited

U.S. PATENT DOCUMENTS

| 11,225,180 B2 * | 1/2022 | Wang ..................... B60N 2/885 |
| 11,618,362 B1 * | 4/2023 | Yang ........................ B60N 3/00 296/1.07 |

FOREIGN PATENT DOCUMENTS

| CN | 210454562 U | * | 5/2020 |
| CN | 211943160 U | * | 11/2020 |
| CN | 215190739 U | * | 12/2021 |
| CN | 220096207 U | * | 11/2023 |

* cited by examiner

*Primary Examiner* — Anthony D Barfield
(74) *Attorney, Agent, or Firm* — Hemisphere Law, PLLC; Zhigang Ma

(57) ABSTRACT

A car seat neck pillow with a clamping and fixing structure includes a pillow body, a clamping assembly, and an insertion assembly. The clamping assembly is located on a back of the pillow body, and configured to fix the pillow body at a neck position of a car seat. The insertion assembly located between the pillow body and the clamping assembly, and configured for installation and disassembly of the pillow body and the clamping assembly. A neck pillow is fixed at a neck position of a car seat to avoid the occurrence of movement of the neck pillow when a user swings his head during rest, the neck pillow is not easy to move relative to the neck position of the car seat, the pillow body uses an existing shaped pillow, a middle part of the neck pillow is concave and two ends of the neck pillow are convex.

7 Claims, 4 Drawing Sheets

CAR SEAT NECK PILLOW WITH CLAMPING AND FIXING STRUCTURE

TECHNICAL FIELD

The disclosure belongs to the technical field of car seat neck pillows, in particular to a car seat neck pillow with a clamping and fixing structure.

BACKGROUND

A car neck pillow, which is made of cotton and installed at a neck position of a car seat, is not only an automobile decoration product, but also an automotive interior product that can effectively provide neck support to eliminate driving fatigue.

Most of existing car seat neck pillows are connected with elastic bands (rings) on their backs, and the elastic band is used to limit the car seat neck pillow to a neck position of a car seat. However, an existing structure of the car seat neck pillow is relatively simple, only using the elastic band (ring) to limit the car seat neck pillow. During use, when a user swings his head during rest, the car seat neck pillow will move accordingly, and tightness between the neck pillow and the seat is not good, so that after the user falls asleep, he may experience a phenomenon of sleeping with his head tilted, which causes neck soreness and swelling.

SUMMARY

The disclosure provides a car seat neck pillow with a clamping and fixing structure, aiming to solve a problem mentioned in the background.

The disclosure is implemented as follows. A car seat neck pillow with a clamping and fixing structure includes:
  a pillow body;
  a clamping assembly located on a back of the pillow body, and configured to fixed the pillow body at a neck position of a car seat;
  an insertion assembly located between the pillow body and the clamping assembly, and configured to mount or dismount between the pillow body and the clamping assembly;
  and the clamping assembly includes:
  a shell, internally provided with at least two sliding grooves, and two ends of the shell are defined with through holes connected to the sliding grooves;
  two clamping arms, symmetrically arranged at the two ends of the shell;
  at least two sets of connecting rods, symmetrically arranged on inner sides of the sliding grooves, and ends of the connecting rods close to a middle of the shell are fixedly connected to limited blocks, respectively, and other ends of the connecting rods are connected to the clamping arms through the through holes; and
  springs, sleeved on the connecting rods respectively, and each of the springs is located between a corresponding one of the limit blocks and a corresponding one of the through holes.

In an embodiment, each of the two clamping arms is one of a vertical structure and a curved circular structure.

In an embodiment, the insertion assembly includes:
  a fixed plate, fixed on the back of the pillow body;
  slots, symmetrically arranged at two ends of the fixed plate; and
  insertion blocks, arranged on an end face of the shell corresponding to the pillow body and matched with the slots for insertion.

In an embodiment, an inner side of each of the slots is provided with multiple protrusions with an equidistant distribution, and an outer side of each of the insertion blocks is provided with grooves that match the multiple protrusions.

In an embodiment, the insertion blocks are integrally formed with the shell, and each of the insertion blocks is of an "L" shaped structure.

In an embodiment, the multiple protrusions are made of hard plastic.

In an embodiment, an outer diameter of each of the limit blocks is greater than an inner diameter of the corresponding spring, and an outer diameter of the corresponding spring is greater than an inner diameter of the corresponding through holes.

Compared with the related art, the embodiments of the disclosure mainly have the following beneficial effects.

The disclosure firmly fixes a neck pillow at a neck position of a car seat to avoid the occurrence of movement of the neck pillow when a user swings his head during rest, the neck pillow is not easy to move relative to the neck position of the car seat, the pillow body uses an existing shaped pillow, a middle part of the neck pillow is concave and two ends of the neck pillow are convex, thus constraining the head of the user under the condition that the pillow does not move, preventing the phenomenon of tilting the head, maintaining a healthy sleeping posture and eliminating driving fatigue.

Figure 1:
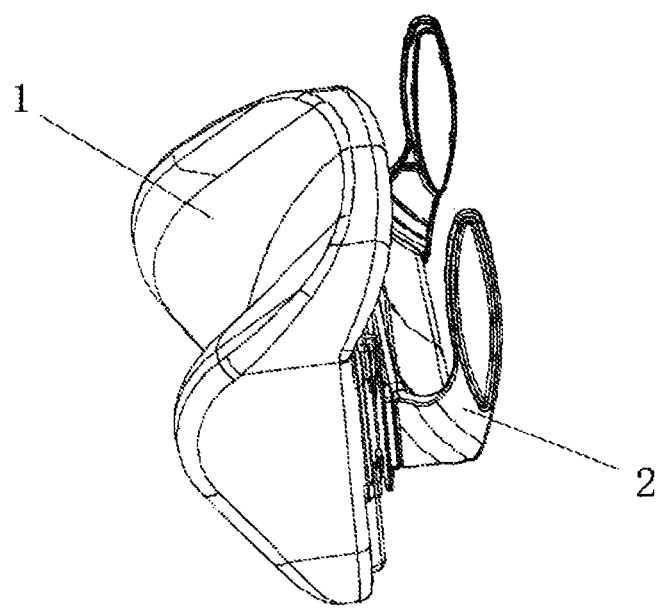
FIG. 1 is a structural schematic diagram provided by the disclosure.

DESCRIPTION OF REFERENCE NUMERALS 1. pillow body; 2. clamping assembly; 201. shell; 202. sliding groove; 203. clamping arm; 204. connecting rod; 205. limited block; 206. spring; 207. through hole; 3. insertion assembly; 301. fixed plate; 302. slot; 303. insertion block; 4. protrusion; 5. groove.

DETAILED DESCRIPTION OF EMBODIMENTS

Unless otherwise defined, all technical and scientific terms used in the disclosure have same meanings to those skilled in the art; terms used in the specification in the disclosure are only for a purpose of describing specific embodiments and are not intended to limit the disclosure; terms "including", "having" and any variations thereof in the specification, claims and accompanying drawings of the disclosure, are intended to cover nonexclusive inclusion. Terms "first", "second", etc. in the specification, the claims and the accompanying drawings of the disclosure are used to distinguish different objects, rather than to describe a specific order.

Reference to the embodiments means that any one of specific features, structures, and characteristics described in conjunction with the embodiments can be included in at least one embodiment of the disclosure. The phrase appearing in various positions in the specification does not necessarily refer to the same embodiment, nor is it an independent or alternative embodiment that is mutually exclusive with other embodiments. Those skilled in art explicitly and implicitly understand that the embodiments described in the disclosure can be combined with other embodiments.

The embodiment of the disclosure provides a car seat neck pillow with a clamping and fixing structure, as shown in FIGS. 1-5, the car seat neck pillow includes a pillow body 1, a clamping assembly 2, and an insertion assembly 3. The clamping assembly 2 is located on a back of the pillow body 1, and configured to fix the pillow body 1 at a neck position of a car seat. The insertion assembly 3 is located between the pillow body 1 and the clamping assembly 2, and configured for installation and disassembly of the pillow body 1 and the clamping assembly 2. And the clamping assembly 2 includes a shell 201, two clamping arms 203, at least two sets of connecting rods 204, limit blocks 205 and springs 206. The shell 201 is internally provided with at least two sliding grooves 202, and two ends of the shell 201 are provided with through holes 207 connected to the sliding grooves 202. The two clamping arms 203 are symmetrically arranged at the two ends of the shell 201. The at least two sets of connecting rods 204 are symmetrically arranged on inner sides of the sliding grooves 202, and ends of the connecting rods 204 close to a middle of the shell 201 are fixedly connected to the limit blocks 205, and other ends of the connecting rods 204 are connected to the clamping arms 203 through the through holes 207. The springs 206 are sleeved on the connecting rods 204, and each of springs is located between a corresponding one of the limit blocks 205 and a corresponding one of the through holes 207. An outer diameter of each of the limit blocks 205 is greater than an inner diameter of the corresponding spring 206, and an outer diameter of the corresponding spring 206 is greater than an inner diameter of the corresponding through hole 207.

In an embodiment, as most of existing car seat neck pillows are connected with elastic bands (rings) on their backs, and the elastic band is used to limit the car seat neck pillow to a neck position of a car seat. However, an existing structure of the car seat neck pillow is relatively simple, only using the elastic band (ring) to limit the car seat neck pillow. During use, when a user swings his head during rest, the car seat neck pillow will move accordingly, and tightness between the neck pillow and the seat is not good, so that after the user falls asleep, he may experience a phenomenon of sleeping with his head tilted, which causes neck soreness and swelling. Therefore, the disclosure provides a clamping assembly 2 between the back of the pillow body 1 and the neck position of the car seat, which is configured to firmly fix the pillow body 1 to the neck position of the car seat, in order to prevent the car seat neck pillow from moving when a user is resting, and the pillow body 1 is not easily detached from the neck position of the car seat. The pillow body 1 uses an existing shaped pillow, a middle part of the neck pillow is concave and two ends of the neck pillow are convex, thus constraining the head of the user under the condition that the pillow does not move, preventing the phenomenon of tilting the head, maintaining a healthy sleeping posture and eliminating driving fatigue.

In an embodiment, the clamping assembly 2 of the disclosure mainly includes a shell 201, two clamping arms 203, a connecting rod 204, limited blocks 205, and springs 206. At least two sliding grooves 202 are defined inside the shell 201, and the connecting rods 204 are arranged on inner sides of the sliding grooves 202. Ends of the connecting rods 204 are fixed with the limited blocks 205, each of the limited blocks 205 is cylindrical in structure, and the limited blocks 205 slide inside the sliding grooves 202. Other ends of the connecting rods 204 pass through the through holes 207 defined on the shell 201, and fixedly connected to the clamping arms 203. By pulling the two clamping arms 203, the clamping arms 203 drive the connecting rods 204 to move, and the limited blocks 205 move outward along a length direction of the sliding grooves 202. The springs 206 are compressed under forces, and the compressed springs give the clamping arms 203 a pulling force inward to achieve a clamping function. The disclosure is suitable for clamping different sizes and types of seats, and the clamping has good stability and is not easy to loosen.

In another embodiment, the clamping assembly 2 mainly includes the shell 201, the two clamping arms 203, the limited blocks 205, and the springs 206. At least two sliding grooves 202 are defined inside the shell 201, and the limited blocks 205 are fixed in the sliding grooves 202. The springs 206 are located between the limited blocks 205 and the clamping arms 203, and an inner diameter of each the through holes 207 defined on the shell 201 is greater than an outer diameter of the corresponding springs 206. By pulling the two clamping arms 203, the clamping arms 203 drive the springs 206 to deform and stretch, thereby achieving the clamping function.

Figure 3:
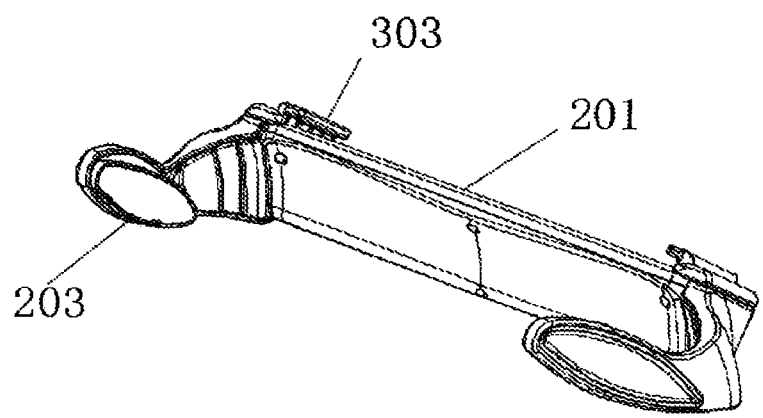
FIG. 3 is a structural schematic diagram of a clamping assembly provided by the disclosure.
Figure 4:
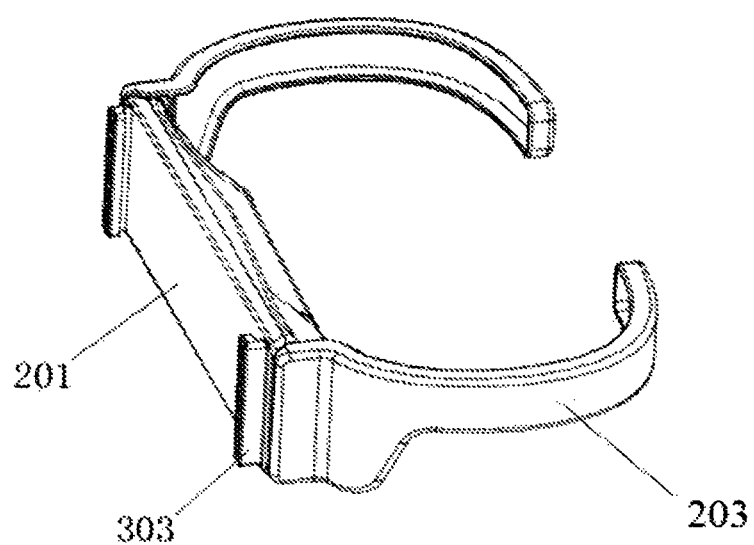
FIG. 4 is another structural schematic diagram of a clamping assembly provided by the disclosure.
Figure 5:
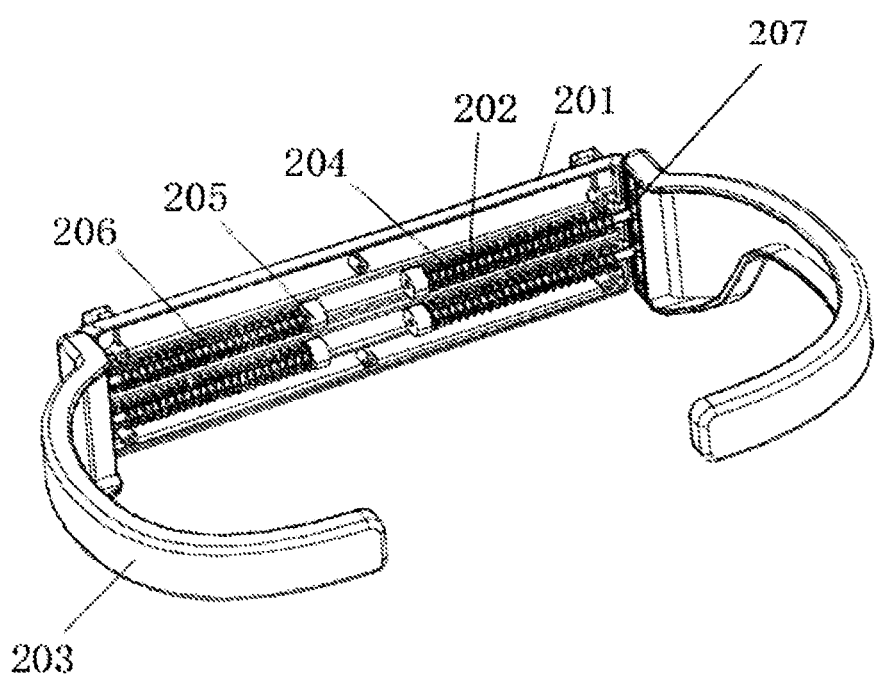
FIG. 5 is a schematic diagram of an internal structure of a clamping assembly provided by the disclosure.

In further preferred embodiments of the disclosure, as shown in FIG. 3 and FIG. 4, each of the two clamping arms 203 is one of a vertical structure and a curved annular structure.

In an embodiment, the clamping arms 203 include two shapes: one is relatively perpendicular to the shell 201, and the clamping arms 203 hold the two ends of the neck position of the car seat; another is a curved circular structure, and the curvature matches the neck position of the car seat, which encircles the neck position of the car seat during the clamping process, thereby making the clamping assembly more stable.

Figure 2:
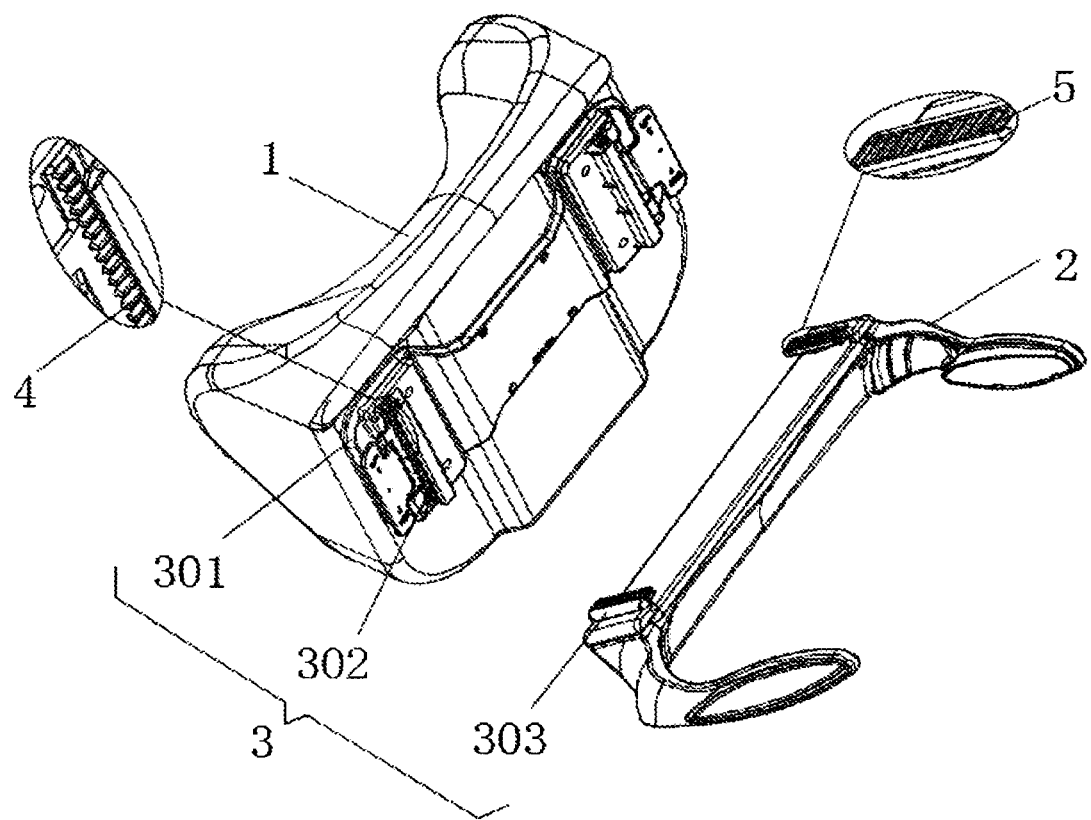
FIG. 2 is a structural schematic diagram of disassembly of a pillow body and a clamping assembly provided by the disclosure.

In a further preferred embodiment of the disclosure, as shown in FIG. 1 and FIG. 2, the insertion assembly 3 includes a fixing plate 301, slots 302 and insertion blocks 303. The fixing plate 301 is fixed on the back of the pillow body 1. The slots 302 are symmetrically arranged at two ends of the fixing plate 301. The insertion blocks 303 are located on an end face of the shell pillow body 201 corresponding to the pillow body 1 and matched with the slots 302 for insertion. An inner side of each of the slots 302 is provided with multiple protrusions 4 with an equidistant distribution, and an outer side of each of the insertion blocks 303 is provided with grooves 5 that match the multiple protrusions 4. The insertion blocks 303 are integrally formed with the shell 201, and each of the insertion blocks 303 is of an "L" shaped structure. The multiple protrusions 4 are made of hard plastic.

In an embodiment, the insertion assembly 3 mainly includes the fixed plate 301, the slots 302, and the insertion blocks 303. The fixed plate 301 is fixedly connected to the pillow body 1 through strong adhesive, and the two slots 302 are respectively set at two ends of a back of the fixed plate 301. The insertion blocks 303 are integrally formed with the shell 201. In addition, the multiple protrusions 4 and grooves 5 matched with the protrusions 4 are also set between the slots 302 and the insertion blocks 303. After inserting the insertion blocks 303 into the slots 302, the insertion blocks 303 are restricted by the protrusions 4 and grooves 5 to prevent easy upward and downward movements between the slots 302 and the insertion blocks 303. When it is necessary to disassemble and separate the pillow body 1 from the clamping assembly 2, the pillow body 1 is slightly lifted up with an equal force, causing the multiple protrusions 4 to deform and detach from limits of the grooves 5. A setting of the protrusions 4 and the grooves 5 is convenient for adjusting an elevation of the pillow body 1 relative to the clamping assembly 2, thus adapting to adjustments of habits and comfort of different people.

It is noted that for the sake of simple description, the embodiments are all expressed as a series of action combinations. However, those skilled in the art are aware that the disclosure is not limited by an action sequence, as according to the disclosure, certain steps may be performed in other sequences or simultaneously. Secondly, those skilled in the art are further aware that the embodiments are all preferred embodiments, and actions and modules involved may not necessarily be necessary for the disclosure.

In the several embodiments provided in the disclosure, it is understood that the disclosed device is implemented in other ways. For example, the embodiments are only illustrative; for example, a division of units is implemented in other ways, such as multiple units or components is combined or integrated into another system, or some features are ignored or not executed. On another hand, coupling or communication connection displayed or discussed between each other is indirect coupling or communication connection between some interfaces, devices or units, which are in the form of telecommunications or other forms.

The units as separate components can be or may not be physically separated, and the components displayed as the units can be or may not be physical units, which can be located in one place or distributed across multiple network units. Some or all of the units can be selected according to actual needs to achieve the purpose of the embodiments.

The embodiments are only used to illustrate the technical solution of the disclosure, rather than limiting a protection scope of the disclosure. Obviously, the embodiments are only some of the embodiments of the disclosure, not all the embodiments. Based on the embodiments, all other embodiments obtained by those skilled in the art without creative labor fall within the protection scope of the disclosure. Although the disclosure has been described in detail with reference to the embodiments, those skilled in the art can still combine, add, delete, or make other adjustments to the features in each embodiment of the disclosure according to the situation without making creative labor, in order to obtain different and essentially unrelated technical solutions from the concept of the disclosure, these technical solutions belong to the protection scope required by the disclosure.

What is claimed is:

1. A car seat neck pillow with a clamping and fixing structure comprises:
   a pillow body;
   a clamping assembly located on a back of the pillow body, and configured to fix the pillow body at a neck position of a car seat;
   an insertion assembly located between the pillow body and the clamping assembly, and configured to mount or dismount between the pillow body and the clamping assembly;
   wherein the clamping assembly comprises:
   a shell, internally defined with at least two sliding grooves, wherein two ends of the shell are defined with through holes connected to the sliding grooves;
   two clamping arms, symmetrically arranged at the two ends of the shell;
   at least two sets of connecting rods, symmetrically arranged on inner sides of the sliding grooves, wherein ends of the connecting rods close to a middle of the shell are fixedly connected to limited blocks, respectively, and other ends of the connecting rods are connected to the clamping arms through the through holes; and
   springs, sleeved on the connecting rods respectively, wherein each of the springs is located between a corresponding one of the limit blocks and a corresponding one of the through holes.

2. The car seat neck pillow with the clamping and fixing structure as claimed in claim 1, wherein each of the two clamping arms is one of a vertical structure and a curved circular structure.

3. The car seat neck pillow with the clamping and fixing structure as claimed in claim 2, wherein the insertion assembly comprises:
   a fixed plate, fixed on the back of the pillow body;
   slots, symmetrically arranged at two ends of the fixed plate; and
   insertion blocks, arranged on an end face of the shell corresponding to the pillow body and matched with the slots for insertion.

4. The car seat neck pillow with the clamping and fixing structure as claimed in claim 3, wherein an inner side of each of the slots is provided with protrusions with an equidistant distribution, and an outer side of each of the insertion blocks is provided with grooves that match the protrusions.

5. The car seat neck pillow with the clamping and fixing structure as claimed in claim 4, wherein the insertion blocks are integrally formed with the shell, and each of the insertion blocks is of an "L" shaped structure.

6. The car seat neck pillow with the clamping and fixing structure as claimed in claim 4, wherein the protrusions are made of hard plastic.

7. The car seat neck pillow with the clamping and fixing structure as claimed in claim 2, wherein an outer diameter of each of the limit blocks is greater than an inner diameter of the corresponding spring, and an outer diameter of the corresponding spring is greater than an inner diameter of the corresponding through hole.

* * * * *